(12) United States Patent
Long et al.

(10) Patent No.: US 10,563,569 B2
(45) Date of Patent: Feb. 18, 2020

(54) DIESEL COMBUSTION SYSTEM

(71) Applicant: DALIAN UNIVERSITY OF TECHNOLOGY, Dalian (CN)

(72) Inventors: Wuqiang Long, Dalian (CN); Hua Tian, Dalian (CN); Jiangping Tian, Dalian (CN); Yao Fu, Dalian (CN); Jingchen Cui, Dalian (CN); Kai Sheng, Dalian (CN); Ping Yi, Dalian (CN); Kunpeng Qi, Dalian (CN); Qiang Zhang, Dalian (CN); Yicong Wang, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 15/865,296

(22) Filed: Jan. 9, 2018

(65) Prior Publication Data

US 2018/0128158 A1 May 10, 2018

Related U.S. Application Data

(63) Continuation-in-part of application No. 14/529,187, filed on Oct. 31, 2014, which is a continuation-in-part
(Continued)

(30) Foreign Application Priority Data

May 16, 2012 (CN) .......................... 2012 1 0152367

(51) Int. Cl.
*F02B 23/06* (2006.01)
*F02F 1/24* (2006.01)
(Continued)

(52) U.S. Cl.
CPC .......... *F02B 23/0651* (2013.01); *F02F 1/242* (2013.01); *F02F 3/28* (2013.01); *F02B 1/12* (2013.01); *Y02T 10/125* (2013.01)

(58) Field of Classification Search
CPC .... F02B 1/12; F02B 23/0651; F02B 23/0627; F02B 23/0642; F02B 23/0696; F02B 23/0633; F02F 1/242; F02F 3/28
See application file for complete search history.

(56) References Cited

U.S. PATENT DOCUMENTS 4,562,807 A * 1/1986 Matsui ................ F02B 23/0621
123/260
6,152,101 A * 11/2000 Parsi ....................... F02B 23/06
123/193.6
(Continued)

FOREIGN PATENT DOCUMENTS

WO    WO 2011092459 A1 * 8/2011 .......... F02B 23/0669

*Primary Examiner* — Hung Q Nguyen
*Assistant Examiner* — Brian P Monahon

(57) ABSTRACT

A diesel combustion system including a piston, an annular impinging block, and a combustion chamber. The combustion chamber is divided by the annular impinging block into an upper chamber and a lower chamber. The annular impinging block includes a lower guide surface that is adjacent to the lower chamber and that extends from a trough line connected to the piston to a crest line. The ratios among the inner diameter of the top of the piston, the outer diameter of the top of the piston, the diameter of the trough line, and the diameter of the crest line define the shape of the combustion chamber which leads to increased rate of combustion, reduced soot emission, and increased fuel efficiency.

1 Claim, 4 Drawing Sheets

Related U.S. Application Data of application No. PCT/CN2013/000574, filed on May 15, 2013.

(51) Int. Cl.
*F02F 3/28* (2006.01)
*F02B 1/12* (2006.01)

(56) References Cited

U.S. PATENT DOCUMENTS

| | | | | |
|---|---|---|---|---|
| 6,513,476 B1* | 2/2003 | Liu | ...................... | F02B 23/0672 |
| | | | | 123/193.6 |
| 6,536,404 B2* | 3/2003 | Liu | ...................... | F02B 23/0672 |
| | | | | 123/263 |
| 6,601,561 B1* | 8/2003 | Liu | ...................... | F02B 23/0672 |
| | | | | 123/263 |
| 6,637,402 B2* | 10/2003 | Liu | ...................... | F02B 23/0672 |
| | | | | 123/193.6 |
| 6,705,273 B1* | 3/2004 | Liu | ...................... | F02B 23/0672 |
| | | | | 123/263 |
| 6,732,702 B2* | 5/2004 | Liu | ...................... | F02B 23/0672 |
| | | | | 123/279 |
| 6,892,689 B2* | 5/2005 | Bischofberger | .... | F02B 23/0603 |
| | | | | 123/193.6 |
| 8,276,563 B2* | 10/2012 | Quigley | ............... | F02B 23/0693 |
| | | | | 123/193.6 |
| 8,978,621 B2* | 3/2015 | Easley | ................ | F02B 23/0624 |
| | | | | 123/193.6 |
| 2002/0014219 A1* | 2/2002 | Suzuki | .................. | F02B 17/005 |
| | | | | 123/305 |
| 2004/0177828 A1* | 9/2004 | Liu | ........................... | F02F 3/26 |
| | | | | 123/279 |
| 2004/0216714 A1* | 11/2004 | Tayama | ................. | F02B 23/101 |
| | | | | 123/276 |
| 2005/0098145 A1* | 5/2005 | Tsuchida | ............... | F02B 17/005 |
| | | | | 123/299 |
| 2007/0261663 A1* | 11/2007 | Lineton | ................... | B23K 26/34 |
| | | | | 123/270 |
| 2009/0025674 A1* | 1/2009 | Leitl | ........................ | B22C 9/105 |
| | | | | 123/193.6 |
| 2009/0025675 A1* | 1/2009 | Ilkubo | ................. | F02B 23/0672 |
| | | | | 123/193.6 |
| 2009/0025681 A1* | 1/2009 | Takahashi | ............ | F02B 23/0669 |
| | | | | 123/305 |
| 2009/0139487 A1* | 6/2009 | Dingle | .................... | F02M 61/06 |
| | | | | 123/445 |
| 2009/0217905 A1* | 9/2009 | Tanaka | ................. | F02B 23/0669 |
| | | | | 123/276 |
| 2010/0006061 A1* | 1/2010 | Shibata | ............... | F02B 23/0621 |
| | | | | 123/307 |
| 2010/0122686 A1* | 5/2010 | Kim | ..................... | F02B 23/0651 |
| | | | | 123/298 |
| 2010/0147251 A1* | 6/2010 | Blau | ......................... | F02F 3/00 |
| | | | | 123/193.6 |
| 2010/0162986 A1* | 7/2010 | Grossle | ................... | F02B 23/06 |
| | | | | 123/193.6 |
| 2011/0253094 A1* | 10/2011 | Rothbauer | .......... | F02B 23/0651 |
| | | | | 123/276 |
| 2011/0259297 A1* | 10/2011 | Rothbauer | .......... | F02B 23/0651 |
| | | | | 123/276 |
| 2012/0234285 A1* | 9/2012 | Venugopal | ........... | F02B 23/0651 |
| | | | | 123/193.6 |
| 2013/0036998 A1* | 2/2013 | Cornwell | ............ | F02B 23/0669 |
| | | | | 123/193.6 |

\* cited by examiner

DIESEL COMBUSTION SYSTEM

CROSS-REFERENCE TO RELATED APPLICATIONS

This application is a continuation-in-part of and claims domestic priority to U.S. patent application Ser. No. 14/529,187, filed Oct. 31, 2014, now pending, which is a continuation-in-part of International Patent Application No. PCT/CN2013/000574 with an international filing date of May 15, 2013, designating the United States, and further claims priority benefits to Chinese Patent Application No. 201210152367.6 filed May 16, 2012. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a diesel combustion system, and more particularly to a diesel combustion system comprising a double-layer combustion chamber.

Description of the Related Art

In general, air/fuel mixture is unevenly distributed along the circumferential direction in a direct injection diesel engine. The sprayed diesel fuel mist tends to accumulate in the vicinity of the area of impingement thereby producing an over-rich area. The diesel fuel accumulated in the over-rich area does not fully contact air, which results in incomplete combustion of the diesel fuel and, correspondingly, in high soot emission and low fuel efficiency.

SUMMARY OF THE INVENTION

In view of the above-described problems, it is one objective of the invention to provide a diesel combustion system comprising a double-layer combustion chamber that increases the rate of complete combustion of the diesel fuel, reduces the soot emission, and increases fuel efficiency.

To achieve the above objective, in accordance with one embodiment of the invention, there is provided a diesel combustion system comprising an injector, a cylinder head, a cylinder liner, a piston, an impinging block in an annular shape, and a combustion chamber. The cylinder head is disposed on the cylinder liner; the injector extends through the cylinder head; the piston is inserted in the cylinder liner and movable with respect to the cylinder liner; and the impinging block protrudes from the piston toward the injector. The combustion chamber is confined by the cylinder head, the cylinder liner, the piston, and the impinging block. The combustion chamber is divided by the impinging block into an upper chamber that is disposed adjacent to the cylinder head, and a lower chamber. The impinging block comprises an upper guide surface disposed adjacent to the upper chamber, and a lower guide surface disposed adjacent to the lower chamber, and an impinging surface disposed between the upper guide surface and the lower guide surface. The lower guide surface and the piston intersect at a trough line, the lower guide surface and the impinging surface intersect at a crest line; and the lower guide surface extends from the trough line to the crest line. The ratio of the inner diameter of the top of the piston to the outer diameter of the top of the piston is larger than 0.75; the ratio of the diameter of the crest line to the outer diameter of the top of the piston is smaller than 0.6; the ratio of the diameter of the trough line to the inner diameter of the top of the piston is smaller than 1; and the ratio of the diameter of the trough line to the diameter of the crest line is larger than 1.06.

In a class of one embodiment, the annular impinging block comprises a boss that protrudes either from the upper guide surface or from the lower guide surface.

In a class of one embodiment, the annular impinging block comprises two bosses that protrude respectively from the upper guide surface and the lower guide surface.

In a class of one embodiment, the impinging surface is a curved surface; a conical surface; a combination of two curved surfaces and a middle surface that is flat, curved, or conical; or a combination of two curved surfaces.

In a class of one embodiment, the upper or lower guide surface of the impinging block is a flat surface, a concave surface, a combination of a concave surface and a flat surface, or a combination of two concave surfaces.

In the process of spraying diesel fuel, the diesel fuel spray impinges against the impinging block, part of the diesel fuel spray is rebounded by the convex impinging surface, and part of the diesel fuel spray is diffused along the upper guide surface and the lower guide surface surrounding the convex impinging surface whereby achieving a double-layer split flow of the diesel fuel spray. Consequently, the ratio of the diesel fuel that is accumulated in the vicinity of the area of impingement is reduced, and hence the ratio of the diesel fuel that contacts with ambient air is increased. As such, the rate of complete combustion of the diesel fuel is increased, the soot emission is reduced, and the fuel efficiency of the diesel combustion system is increased.

Advantages to embodiments of the invention are summarized as follows:

The ratio of the inner diameter of the top of the piston to the outer diameter of the top of the piston is larger than 0.75; the ratio of the diameter of the crest line to the outer diameter of the top of the piston is smaller than 0.6; the ratio of the diameter of the trough line to the inner diameter of the top of the piston is smaller than 1; and the ratio of the diameter of the trough line to the diameter of the crest line is larger than 1.06. The above-mentioned ratios define the combustion chamber into a particular shape that unexpectedly increases the rate of complete combustion of the diesel fuel, reduces the soot emission, and increases the fuel efficiency of the diesel combustion system. Under rated working conditions, in contrast to conventional diesel combustion systems, the fuel consumption of the direct injection diesel combustion system of this invention is decreased by 3%, and the smoke emission is decreased by 50%. Furthermore, under the above-mentioned ratios among the several diameters, the piston provides a high mechanic strength for ensuring the reliability of the diesel combustion system.

In addition, the boss(es) disposed on the upper and/or lower guide surface further increase(s) the rate of complete combustion of the diesel fuel, reduces the soot emission, and increases the fuel efficiency of the diesel combustion system.

BRIEF DESCRIPTION OF THE DRAWINGS

The invention is described hereinbelow with reference to the accompanying drawings, in which.

Figure 1:
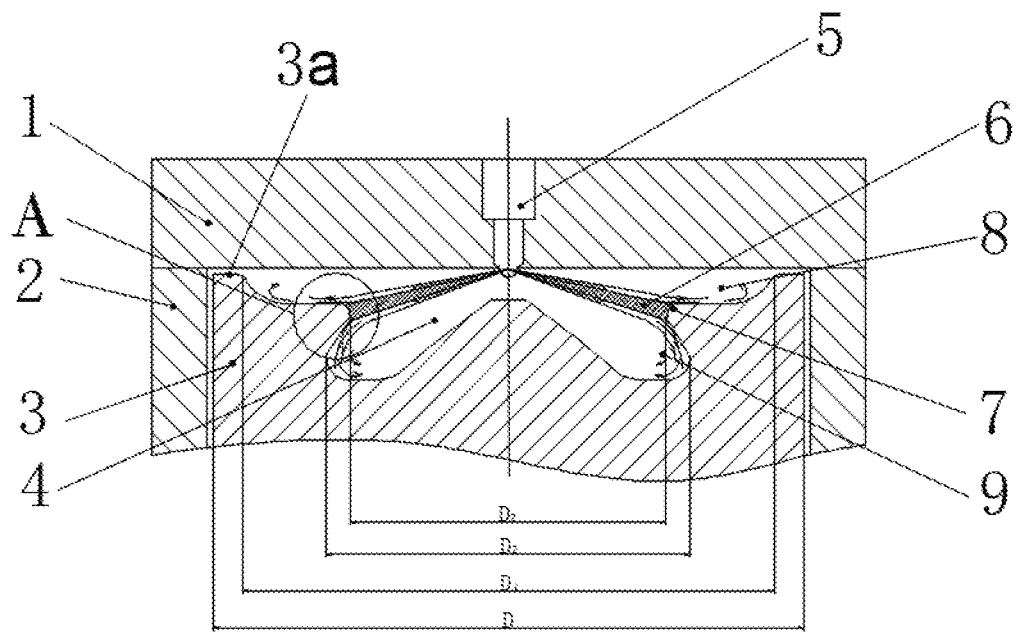
FIG. 1 is a schematic diagram of a diesel combustion system in accordance with one embodiment of the invention.

In the drawings, the following reference numbers are used: 1. Cylinder head; 2. Cylinder liner; 3. Piston; 3a. Top of piston; 4. Combustion chamber; 5. Injector; 6. Diesel fuel spray; 7. Impinging block; 8. Upper chamber; 9. Lower chamber; 10. Impinging surface; 11. Upper guide surface; 12. Lower guide surface; 13. Boss.

DETAILED DESCRIPTION OF THE EMBODIMENTS

For further illustrating the invention, experiments detailing a diesel combustion system comprising a double-layer combustion chamber are described below. It should be noted that the following examples are intended to describe and not to limit the invention.

Figure 2:
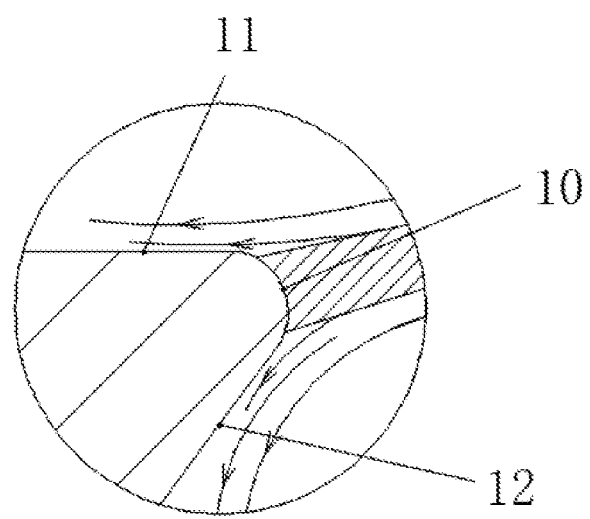
FIG. 2 is an enlarged view of part A in FIG. 1.

As shown in FIGS. 1-2, a direct injection diesel combustion system comprises a cylinder head 1, a cylinder liner 2, a piston 3 comprising a top 3a, a combustion chamber 4, an injector 5, and an annular impinging block 7. The cylinder head 1 is disposed on and connected to the cylinder liner 2. The piston 3 is inserted in the cylinder liner 2 and is movable with respect to the cylinder liner 2. The annular impinging block 7 protrudes from the piston 3 toward the injector 5. The combustion chamber 4 is confined by the cylinder head 1, the cylinder liner 2, the piston 3, and the impinging block 7. The injector 5 extends through the cylinder head 1 and is configured to inject high pressure diesel fuel into the combustion chamber 4. The combustion chamber 4 is divided by the impinging block 7 into an upper chamber 8 that is disposed adjacent to the cylinder head 1 and a lower chamber 9.

The impinging block 7 comprises an impinging surface 10, an upper guide surface 11, and a lower guide surface 12. When the diesel fuel is injected by the injector 5 toward the impinging surface 10, part of the diesel fuel spray is rebounded by the impinging surface 10, and part of the diesel fuel spray is diffused along the upper guide surface 11 and the lower guide surface 12 to form two flows. As a result, the ratio of the diesel fuel that accumulates in the vicinity of the area of the impingement is decreased; and the ratio of the diesel fuel that contacts with ambient air is increased. Correspondingly, the rate of combustion of the diesel fuel is increased, the soot emission is reduced, and the fuel efficiency of the diesel combustion system is increased.

In addition, as shown in FIG. 1, the outer diameter of the top of the piston 3 is designated with D, the inner diameter of the top 3a of the piston 3 is designated with $D_1$. The diameter of the trough line where the lower guide surface 12 and the piston 3 intersect is designated with $D_2$, and the diameter of the crest line where the lower guide surface 12 and the impinging surface 10 intersect is designated with $D_3$. In this invention, the ratios among the above several diameters are configured as follows: the ratio of $D_1$ to D is larger than 0.75, the ratio of $D_3$ to D is smaller than 0.6, the ratio of $D_2$ to $D_1$ is smaller than 1, and the ratio of $D_2$ to $D_3$ is larger than 1.06. The ratios among the several diameters configured in this invention define the particular shape of the chamber that receives the diesel fuel injected by the injector, which unexpectedly increases the rate of complete combustion of the diesel fuel, reduces the soot emission, and increases the fuel efficiency of the diesel combustion system. Under rated working conditions, in contrast to conventional diesel combustion systems, the diesel fuel consumption of the direct injection diesel combustion system comprising the double-layer combustion chamber is decreased by 3%, and the smoke emission is decreased by 50%. In addition, under the above ratios among the several diameters, the piston 3 provides a high mechanic strength for ensuring the reliability of the diesel combustion system.

Figure 3:
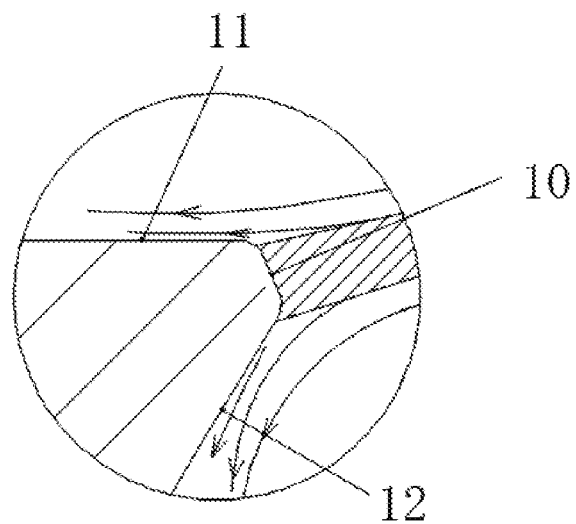
FIG. 3 is a schematic diagram of the impinging block in accordance with one embodiment of the invention.
Figure 4:
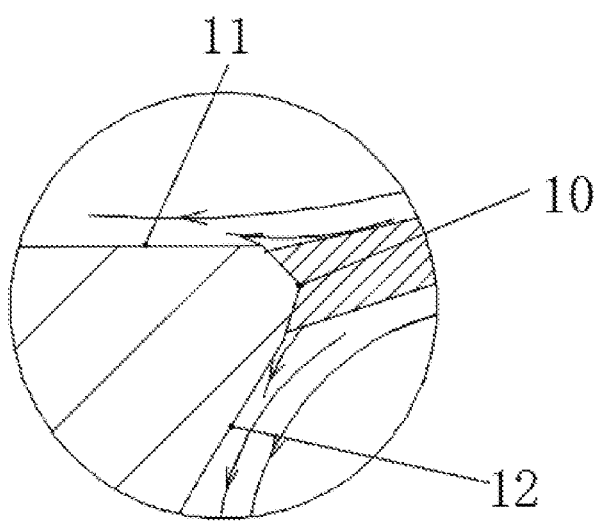
FIG. 4 is a schematic diagram of the impinging block in accordance with one embodiment of the invention.

The impinging surface 10 of the impinging block 7 is a curved surface; a conical surface; a combination of two curved surfaces and a middle surface that is flat, curved, or conical; or a combination of two curved surfaces. For example, FIGS. 2-4 illustrate the different shapes of the impinging surface 10. Specifically, in FIG. 2, the impinging surface 10 is a curved surface. In FIG. 3, the impinging surface 10 consists of two transition curved surfaces that are respectively connected to the upper guide surface 11 and the lower guider surface 12, and a middle flat surface that is disposed between the two transition curved surfaces. In some embodiments, the middle flat surface shown in FIG. 3 is changed as a conical surface or a curved surface. In FIG. 4, the impinging surface 10 is a conical surface.

Figure 5:
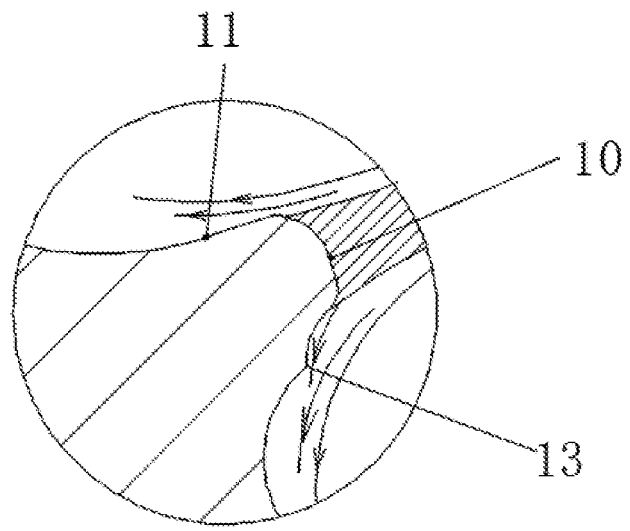
FIG. 5 is a schematic diagram of the impinging block in accordance with one embodiment of the invention.
Figure 6:
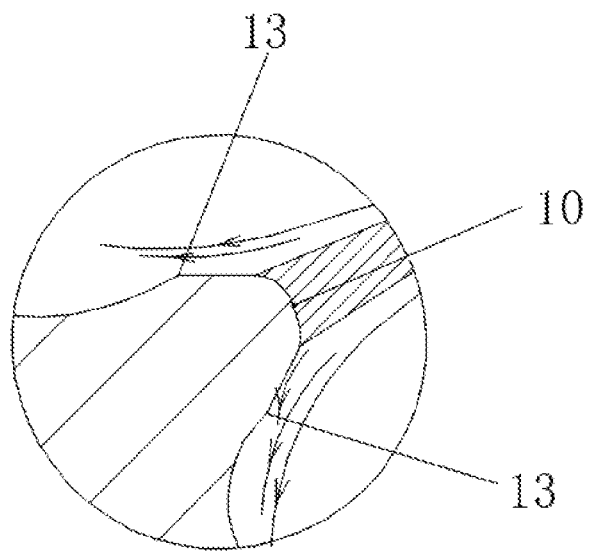
FIG. 6 is a schematic diagram of the impinging block in accordance with one embodiment of the invention.
Figure 7:
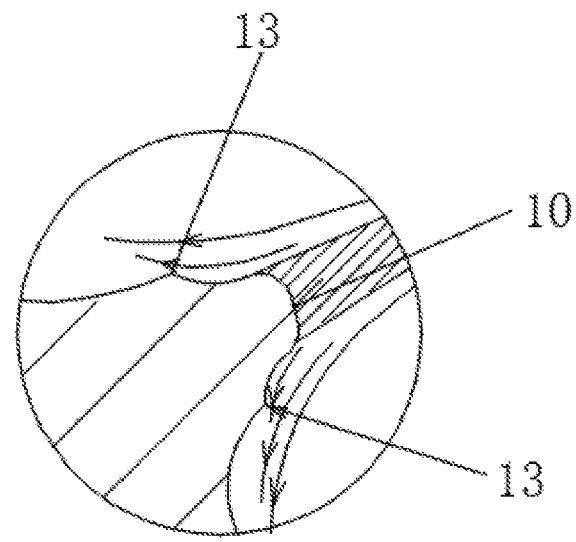
FIG. 7 is a schematic diagram of the impinging block in accordance with one embodiment of the invention.
Figure 8:
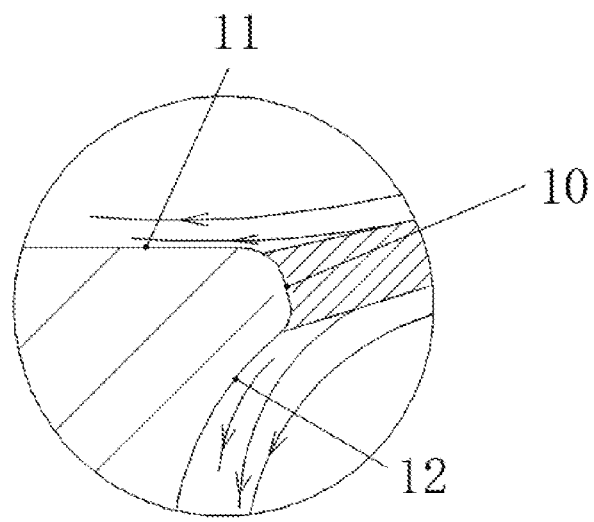
FIG. 8 is a schematic diagram of the impinging block in accordance with one embodiment of the invention.

Either one of or both of the upper guide surface 11 and the lower guide surface 12 are provided with a boss 13. For example, FIG. 5 illustrates a boss 13 is disposed on the lower guide surface 12. FIGS. 6-7 illustrate two bosses 13 are respectively disposed on the upper guide surface 11 and the lower guide surface 12. One or both of the two flows of the diesel fuel impinges on the boss(es) 13 so that the flow(s) is/are better diffused. Therefore, the accumulation of the diesel fuel is further reduced, and the ratio of the diesel fuel that contacts with the air is further increased. Correspondingly, the rate of complete combustion of the diesel fuel is further increased.

In some embodiments, the upper or lower guide surface of the impinging block 7 is a flat surface, a concave surface, a combination of a concave surface and a flat surface, or a combination of two concave surfaces. For example, FIGS. 2-7 illustrate the shapes of the upper guide surface 11 of the impinging block 7. Specifically, in FIGS. 2-4, the upper guide surface 11 is a flat surface. In FIG. 5, the upper guide surface 11 is a curved surface. In FIG. 6, the upper guide surface 11 consists of a flat surface and a curved surface. In FIG. 7, the upper guide surface 11 consists of two curved surfaces.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A system for combusting diesel fuel, the system comprising:
    an injector;
    a combustion chamber, said combustion chamber comprising a first chamber and a second chamber;
    a cylinder head;
    a cylinder liner;

a piston, the piston comprising a piston top and a central piston axis; and an annular impinging block, the annular impinging block comprising a first boss, an impinging surface, a first guide surface, and a second guide surface;

wherein:

said cylinder head is disposed on said cylinder liner;

said injector extends through said cylinder head;

said piston is inserted in said cylinder liner and movable with respect to said cylinder liner;

said annular impinging block protrudes from said piston toward said injector;

said combustion chamber is confined by said cylinder head, said cylinder liner, said piston, and said impinging block;

said combustion chamber is subdivided by said annular impinging block into said first chamber and said second chamber;

said first chamber is disposed adjacent to said cylinder head;

said second chamber is disposed adjacent to said central piston axis;

said first guide surface is disposed adjacent to said first chamber;

said second guide surface is disposed adjacent to said second chamber;

said impinging surface is disposed between said first guide surface and said second guide surface;

said injector is adapted to inject the diesel fuel toward said impinging surface, and the fuel jets from the injector orifices impinge on the said impinging surface and split to a first part spreading in the said first chamber and a second part spreading in the said second chamber;

said impinging surface is a convex surface; and said first boss protrudes from said first guide surface or said second guide surface;

the ratio of an inner diameter of said piston top to an outer diameter of said piston top with respect to said central piston axis is larger than 0.75;

the ratio of an inner diameter of said impinging surface to said outer diameter of said piston top with respect to said central piston axis is smaller than 0.6;

the ratio of an outer diameter of said second chamber to said inner diameter of said piston top with respect to said central piston axis is smaller than 1; and the ratio of said outer diameter of said second chamber to said inner diameter of said impinging surface with respect to said central piston axis is larger than 1.06; and said annular impinging block further comprises a second boss, and said first boss and said second boss protrude respectively from said first guide surface and from said second guide surface.

* * * * *